Sept. 5, 1967  M. H. GROVE  3,339,950
COUPLING DEVICES
Filed April 1, 1965
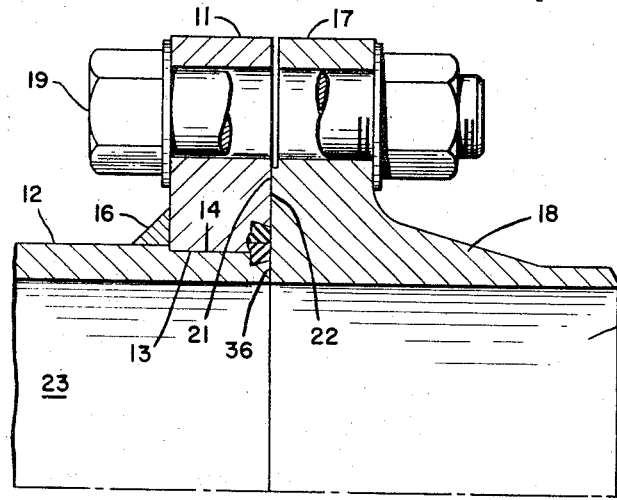
Fig_1
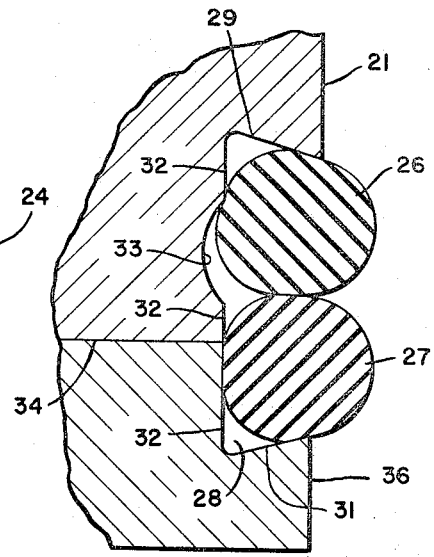
Fig_2
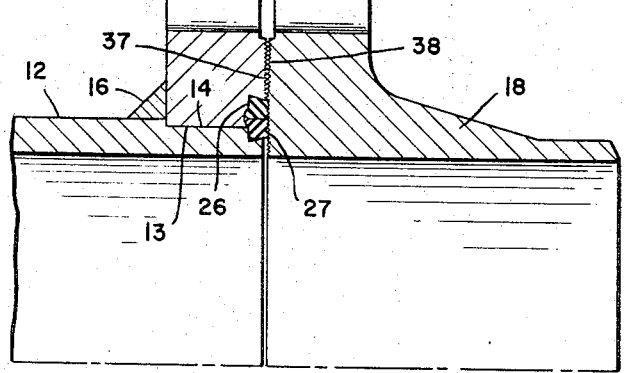
Fig_3
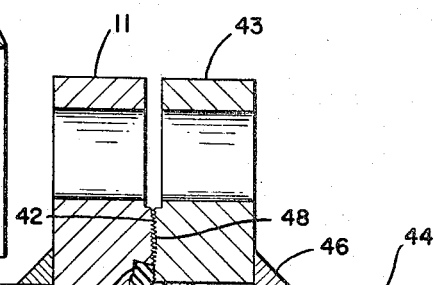
Fig_5
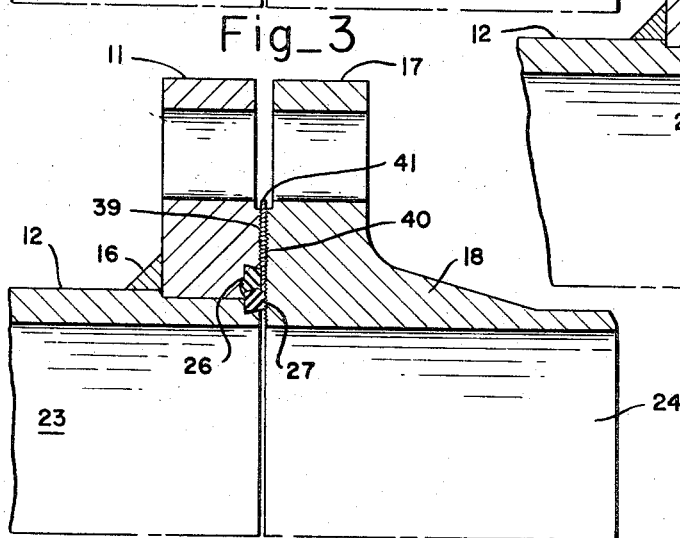
Fig_4
INVENTOR.
MARVIN H. GROVE
BY
ATTORNEYS

United States Patent Office 3,339,950
Patented Sept. 5, 1967

3,339,950
COUPLING DEVICES
Marvin H. Grove, Piedmont, Calif., assignor to M & J Valve Company, Houston, Tex., a corporation of Delaware
Filed Apr. 1, 1965, Ser. No. 444,566
4 Claims. (Cl. 285—363)

This invention relates generally to coupling devices of the flange type such as are employed to form sealed connections between various parts.

In the assembly involving application of fluid pressures, couplings of the flange type are commonly employed for making various connections, such as connections between pipe sections, between pipes and flow control valves, or between pipes or valves and pressure vessels. Simple couplings of this type consist of rigid metal flanges having angular clamping faces that are bolted together. The flanges are welded or otherwise secured to pipe sections, valve hubs, or other parts to be connected. A gasket or other sealing member is inserted between the clamping faces of the flanges before they are bolted together. Sealing means of the resilient O-ring type have been employed to a limited extent in such couplings, but have not been widely adopted because of various limitations. Particularly, they have not been applicable to various types of flange couplings, due to the limited area of the sealing contact provided.

In general, it is an object of the present invention to provide a coupling device of the above character which is applicable to various types of flange couplings.

Another object of the invention is to provide coupling devices of the above character which provide a sealing contact area of substantial radial width.

Another object of the invention is to provide a new coupling device which makes novel use of a plurality of seal rings of the resilient O-ring type.

Additional objects and features of the invention will appear from the following description in which the preferred embodiment of the invention has been set forth in detail in conjunction with the accompanying drawing.

Referring to the drawing:

FIGURE 1 is a side elevational view, partly in section, illustrating a pipe coupling incorporating the present invention;

FIGURE 2 is a detail in section on an enlarged scale illustrating the sealing elements utilized in FIGURE 1;

FIGURE 3 is a side elevational detail in section illustrating a modified form of coupling;

FIGURE 4 is a detail in section illustrating another modified form of coupling; and FIGURE 5 is a detail in section illustrating an additional modified form of coupling.

The coupling shown in FIGURE 1 is suitable for making connection between two adjacent pipe sections, or between a pipe section and the hub of a valve. One part or structure of this coupling consists of the annular flange 11 which is secured to one end portion of the pipe 12. Assuming that these two portions are secured together by welding, the end of the pipe 12 may be machined as indicated at 13 and fitted into the machine opening 14 of the flange. Thereafter, the weld metal 16 is applied. The other part or structure of the coupling consists of the annular flange 17, which is formed integral with the body 18. This body may be the short hub of a valve, or it may be a body adapted to be secured by welding to an adjacent pipe section. The flanges 11 and 17 are provided with circumferentially spaced aligned openings for receiving the clamping bolts 19. The abutting annular faces 21 and 22 of the flanges 11 and 17 can be referred to as annular clamping faces. In explanation of the appended claims, these clamping faces may be stated to surround the flow passages 23 and 24, which are in alignment and connected by the coupling.

The sealing means employed with the assembly described above is best illustrated in FIGURE 2. It consists of two resilient seal rings 26 and 27 which are in direct engagement and disposed concentric with respect to each other. These seal rings are accommodated within a recess 28 which opens through the plane of one of the clamping faces, as for example the face 21. In section, the recess 28 is defined by the outer and inner peripheral surfaces 29 and 31, and by the bottom surface 32. The surfaces 29 and 31 are convergent toward the plane of the clamping face 21. Thus both surfaces are inclined at angles less than 90° to the plane of the clamping face. By way of example, this angle can be of the order of 75°. An annular groove 33 is formed in the bottom wall 32 and is spaced from and disposed intermediate the peripheral surfaces 29 and 31. The line 34 as it appears in FIGURE 2 represents the junction line between the contacting peripheral surfaces 13 and 14 of FIGURE 1. As viewed in a direction toward the clamping face 21, this junction line is a circle. Preferably, the proportions are such that line 34 is located intermediate the groove 33 and the inner peripheral surface 31.

The seal rings 26 and 27 when relaxed, or in other words when not installed within the recess 28, are circular in section. In other words, they are resilient rings of the O-ring type. The relaxed diameter of each ring is greater than the depth of the recess 28, and the radius of each relaxed ring is less than the depth of the recess. The combined diameters of the two rings is substantially greater than the radial distance between the periperal surfaces 29 and 31.

With the proportions described above, installation of the rings 26 and 27 into the recess 28 requires some compression in a radial direction. This compression causes some distortion of the seal rings from their relaxed circular form, as is illustrated in FIGURE 2. By virtue of their compression, the seal rings are retained within the recess 28, the retention being sufficient to permit shipping or handling.

When the parts 11 and 17 are assembled in the manner shown in FIGURE 1, the exposed side faces of the rings 26 and 27 are engaged by the clamping face 22 of flange 17, with both seal rings being squeezed within the recess 28. This squeezing of the seal rings causes further distortion from their relaxed circular form, as shown in FIGURE 1. After being squeezed in this manner by assembly of the coupling, the recess 28 continues to provide a limited amount of free space to facilitate proper action of the seal rings as resilient O-rings and to provide some further space to accommodate any swelling of the seal rings that may occur in use. Also groove 33 provides some further space into which the resilient material may be squeezed as shown in FIGURES 1 to 3.

It will be apparent from FIGURES 1 and 2 that the seal rings 26 and 27 form an effective fluid-tight seal between the two coupling flanges 11 and 17. The inner seal ring 27 is disposed whereby it has sealing contact with the ends of the pipe portion 12, and therefore a seal is established directly between this pipe portion and the other flange 17. This is a desirable feature where one part of the coupling may be of welded construction, because sealing in this fashion ensures a proper seal for the coupling even though the weld metal 16 may not provide a complete seal. It should be understood, however, that where one of the coupling parts is not fabricated by welding, but is made of one integral piece of metal, then the construction illustrated in FIGURE 2 may remain the same except that there will be no junction line 34 between adjacent parts.

The coupling described above establishes a good fluid-tight seal against fluid pressure differentials applied from the passages 23 and 24. It can be used for relatively high pressures, as for example pressures of the order of 600 p.s.i. or higher. When the coupling is assembled, the seal rings are protected against injury. If they should become injured or mutilated for any reason, they can be readily replaced.

The hardness of the seal rings 26 and 27 and the resilient material employed may vary in accordance with requirements. Ordinarily it is considered satisfactory to use O-rings having a durometer hardness of the order of 90. The material may be a suitable synthetic rubber or elastomer.

The end face 36 of the pipe portion 12 may terminate coincident with the plane of the clamping face 21. However, if desired, it can be cut back a small amount without affecting the desired seal.

In the assembly of FIGURE 1, the two clamping faces 21 and 22 are machined smooth. In some instances it is desirable to provide one or both of these clamping faces with concentric grooves which appear in sections as serrations. Thus in FIGURE 3 the two clamping faces 37 and 38 are machined to appear as serrated in section. Such grooved surfaces effectively engage the sides of the seal rings 26 and 27 to form the desired fluid-tight seal.

In some instances it is desirable to insert a gasket between the clamping faces of the two coupling parts. Thus as shown in FIGURE 4, the two grooved clamping faces 39 and 40 are separated by the gasket 41 which may be of metal or a suitable composition, or both. The inner diameter of the gasket 41 is such that its inner margin engages the seal ring 26, but does not engage the ring 27. Thus the seal ring 26 forms an effective seal between the part 11 and the corresponding side of the gasket 41. The inner seal ring 27 not only maintains a seal with respect to the part 11, but in addition engages and seals upon the adjacent portion of clamping surface 40 within the gasket 41. Thus the seal rings 26 and 27 form an effective seal between the two parts of the coupling, independent and separate from any seal established by the gasket 41.

The coupling illustrated in FIGURE 5 consists of a flange 11, like the flange 11 of FIGURE 1, but with a grooved clamping surface 42. The other coupling part consists of a flange 43 attached to the pipe portion 44 by welding 46 and 47. Here again a grooved clamping face 48 is provided. The seal ring 26 in this instance forms an effective seal between the two parts, and is pressed into sealing engagement with the clamping face 48. However, the seal 27 does not engage the clamping face 48 or directly engage any surface contiguous thereto. Thus in this type of coupling assembly, the seal 27 serves mainly to retain the seal 26 in proper sealing position, and in addition it has sealing engagement with ring 26 and the surfaces 31 and 32.

It will be evident from the foregoing that the main part of my coupling can be in accordance with the left hand part of FIGURE 1, and that this part can be used in various styles of couplings, including those described with reference to FIGURES 3, 4 and 5. In each instance, the seal rings 26 and 27 form an effective seal between the two parts, whether the clamping surface be smooth or serrated, and whether or not an additional gasket is used as shown in FIGURE 4.

I claim:
1. In coupling devices of the type employed for making connection between aligned flow passages, a structure having a portion forming an annular planar clamping face and a flow passage surrounded by said face, an annular recess in said portion and opening through the plane of said face, said recess as viewed in section being defined by outer and inner peripheral surfaces that are convergent toward said plane and a bottom surface that is generally parallel to said plane, and a pair of nested concentric resilient seal rings disposed in said recess and in direct physical contact with each other, each ring when relaxed having a radius in section that is less and a diameter greater than the depth of the recess, the diameters of the two rings in section being greater than the radial distance between said inner and outer peripheral surfaces whereby the rings are compressed when positioned in said recess, said rings forming means for making sealing contact with the annular clamping face of a complementary coupling part, said structure comprising a flange having said first named annular clamping face together with a separate annular portion fitted concentrically within the flange and having an annular end surface substantially coincident with the plane of said clamping face, said recess being formed in part in the flange and in part in said annular portion, the circular junction line between the flange and the annular portion being located intermediate the areas of contact between the sealing rings and said bottom surface, said seal rings having areas of sealing contact with the bottom surface formed on the flange and the portion of the bottom surface formed on said annular portion respectively.

2. A coupling device as in claim 1 in which said bottom surface has a groove formed in the same which is located intermediate said junction line and the outer peripheral surface of said recess.

3. In coupling devices of the type employed for making connection between aligned flow passages, a structure having a portion forming an annular planar clamping face and a flow passage surrounded by said face, an annular recess in said portion and opening through the plane of said face, said recess as viewed in section being defined by outer and inner peripheral surfaces that are convergent toward said plane and a bottom surface that is generally parallel to said plane, and a pair of nested concentric resilient O-ring seals disposed in said recess in radial alignment with each other, and in direct physical contact with each other on adjacent faces, said contact area being axially inwardly of the plane of said clamping face, each ring when relaxed having its radius in section less and its diameter greater than the depth of the recess, the sum of the cross-sectional diameters of the two rings in section, in relaxed condition, being greater than the radial distance between said inner and outer peripheral surfaces whereby the rings are compressed when positioned in said recess, said compression causing the material thereof to engage said converging surfaces and the bottom of said recesses to thereby hold said rings therein in compressed condition, the volume of said recess being greater than the combined volumes of said two rings, said rings forming means for making sealing contact with the annular clamping face of a complementary coupling part.

4. A coupling device as in claim 3 in which said recess in section has a groove in the bottom surface of the same that is spaced from and located intermediate said outer and inner peripheral surfaces.

References Cited

UNITED STATES PATENTS

| 1,071,585 | 8/1913 | Rossell | 285—363 |
| 2,407,076 | 9/1946 | Harkness | 285—363 |
| 2,420,718 | 5/1947 | Odelius. | |
| 2,800,926 | 7/1957 | Handley | 285—363 |
| 2,885,227 | 5/1959 | Burger | 277—171 |
| 3,201,156 | 8/1965 | Coats | 285—365 |
| 3,228,096 | 1/1966 | Albro | 285—363 |

FOREIGN PATENTS

| 1,055,534 | 2/1954 | France. |
| 1,324,377 | 3/1963 | France. |
| 894,036 | 2/1965 | Great Britain. |

CARL W. TOMLIN, *Primary Examiner.*

THOMAS F. CALLAGHAN, *Examiner.*

W. L. SHEDD, *Assistant Examiner.*